United States Patent [19] Greenberg

[11] 4,165,350

[45] Aug. 21, 1979

[54] FIRED CERAMIC BOTTLE HAVING THREADED NECK AND METHOD OF MAKING SAME

[75] Inventor: Jerome S. Greenberg, Chicago, Ill.

[73] Assignee: Regal China Corporation, Antioch, Ill.

[21] Appl. No.: 753,782

[22] Filed: Dec. 23, 1976

Related U.S. Application Data

[62] Division of Ser. No. 525,813, Nov. 21, 1974, Pat. No. 4,014,448.

[51] Int. Cl.[2] .............................................. C04B 33/34
[52] U.S. Cl. .......................................... 264/60; 264/86
[58] Field of Search .................................... 264/60, 86

[56] References Cited

U.S. PATENT DOCUMENTS

| | | | |
|---|---|---|---|
| 225,338 | 3/1880 | Campbell | 264/60 |
| 523,955 | 7/1894 | Bates | 264/60 |
| 1,941,403 | 12/1933 | Lansing | 264/60 |

*Primary Examiner*—Robert F. White
*Assistant Examiner*—John A. Parrish
*Attorney, Agent, or Firm*—Pennie & Edmonds

[57] ABSTRACT

A fired ceramic bottle and, particularly, a porcelain bottle is disclosed having an integral threaded neck of fired material for receiving a screw cap. The threaded neck is, preferably, an adapter separately formed apart from the bottle by the "dry press" method and then fired into an integral piece therewith. Additionally, the same method is used to provide a very small opening in ceramic bottles. Also disclosed are means for securing a decorative ceramic top on such a porcelain bottle.

10 Claims, 9 Drawing Figures

FIRED CERAMIC BOTTLE HAVING THREADED NECK AND METHOD OF MAKING SAME

This is a division of application Ser. No. 525,813, filed Nov. 21, 1974, now U.S. Pat. No. 4,014,448.

The manufacture of fired ceramic bottles is an old and well-developed art and such bottles may vary greatly including relatively porous china bottles glazed or unglazed to non-porous porcelain bottles glazed or unglazed. As used herein, the term "fired ceramic" includes all of the same wherein a clay bottle is fired whether the same is customarily called porcelain, china or some other term. In the past, attempts have been made to cast threads on the outer surface of the neck of such bottles for receipt of a suitably threaded cap. However, there is an immense difficulty in achieving a suitably flat sealing surface on the outer edge of the neck for sealing against the sealing gasket of a cap. In particular, it is extremely difficult to achieve a perfectly right angular relationship between the plane of the outer sealing edge with respect to the axis of the neck and therefore the axis of the threads on the neck of the bottle. It is also difficult to insure a flat plane for the outer sealing edge. Such an accurate relationship is required in order to insure adequate sealing when the bottle contains a liquid and in particular liquids having a specific gravity less than water such as alcoholic beverages including, particularly, whiskey.

It is, of course, possible to design molds which will cast threads integral with the neck of a bottle and such has been done in some instances. However, in order to achieve the requisite accuracy between the sealing edge of such a bottle and the axis of the threads, a great deal of handwork is required after molding and the loss factor due to damaged bottles is excessively high. For this reason, screw threads have not previously been available on ceramic bottles where such were to be used for liquids, particularly low density liquids such as alcoholic beverages. Only solids such as coarse granular material and some powders have been really successfully retained in bottles of ceramic material having the threads formed integrally with the neck for the reasons set forth above.

Further, it has heretofore been impossible to provide ceramic bottles with the very small openings commonly used on such products as cologne, after-shave lotion, perfume and the like. Inherent in the process of molding the clay bottle in plaster molds is the need to pour the excess slip out of the bottle opening after the wall of the bottle has dried sufficiently to reach the desired thickness. This requirement to pour the excess slip from the bottle requires a certain minimum size of bottle opening which is greatly in excess of the opening size conventionally used in "shaker" type bottles such as those mentioned above for use with cologne, perfume, etc.

BRIEF SUMMARY OF THE INVENTION

In accordance with this invention, a ceramic bottle is cast in the usual manner with an opening that may or may not include a short neck portion and an adapter molded by the dry press method of ceramic molding is applied to the opening of said bottle. Said adapter extends from the bottle and either has threads integrally molded on the outer surface thereof or is provided with a small "shaker" type opening or both. Glaze is provided between the bottle and adapter and the two are fired into a single integral piece comprising a bottle having a neck with threads, a shaker opening or both. The adapter may be fired or unfired at the time the adapter and bottle are fired into an integral piece as may the bottle itself.

PREFERRED EMBODIMENT

While it is to be understood that the bottles discussed herein may be any fired ceramic bottle, porcelain bottles are preferred. Porcelain as understood in the ceramics industry is a fired clay product which has been completely vitrified by firing at a high temperature of about 2400° F. However, completely vitrified products may be obtained at temperatures lower than 2400° F. and as such the term "porcelain" is not really precise. Nevertheless, it is commercially understood that it refers to a non-porous, completely vitrified product regardless of the specific firing temperature. Bottles which conform to the accepted understanding of porcelain are impermeable to liquids and gasses including, particularly, whiskey even when unglazed whereas other fired ceramic containers, less completely vitrified, are more or less porous, though they may be made substantially impervious even to such materials as whiskey by suitable internal or external fired glazes or both.

One method of manufacturing ceramic and, in particular, porcelain bottles, is disclosed in U.S. Pat. No. 3,691,266. The slip utilized in such bottle moldings is generally well known and comprises a slurry of various clays and water in various proportions with, commonly, about 25%-30% by weight of the slurry being water. Such bottles are cast by filling mating plaster mold halves with the slip, waiting until the slip adjacent to the mold has dried to a sufficient thickness due to the capillary action of the plaster molds, pouring off the excess slip, removing the "spare" from the filler opening, removing the bottle from the mold, and firing the bottle one or more times with or without glazes or other decorations as may be desired. The top portion of such a bottle is shown at 10 in FIG. 1 and comprises a neck portion 12 and a shoulder portion 14. It will be appreciated, however, that the bottle adjacent the neck may have other shapes; one variety being shown in FIG. 2 where the bottle 10′ has an opening defined by the portion 12′ with the remainder of the bottle taking any desired shape and being indicated only for purposes of illustration at 14′. It will be appreciated that the portion 12′ is not, strictly speaking, a neck though it does define the opening of the bottle.

Figure 1:
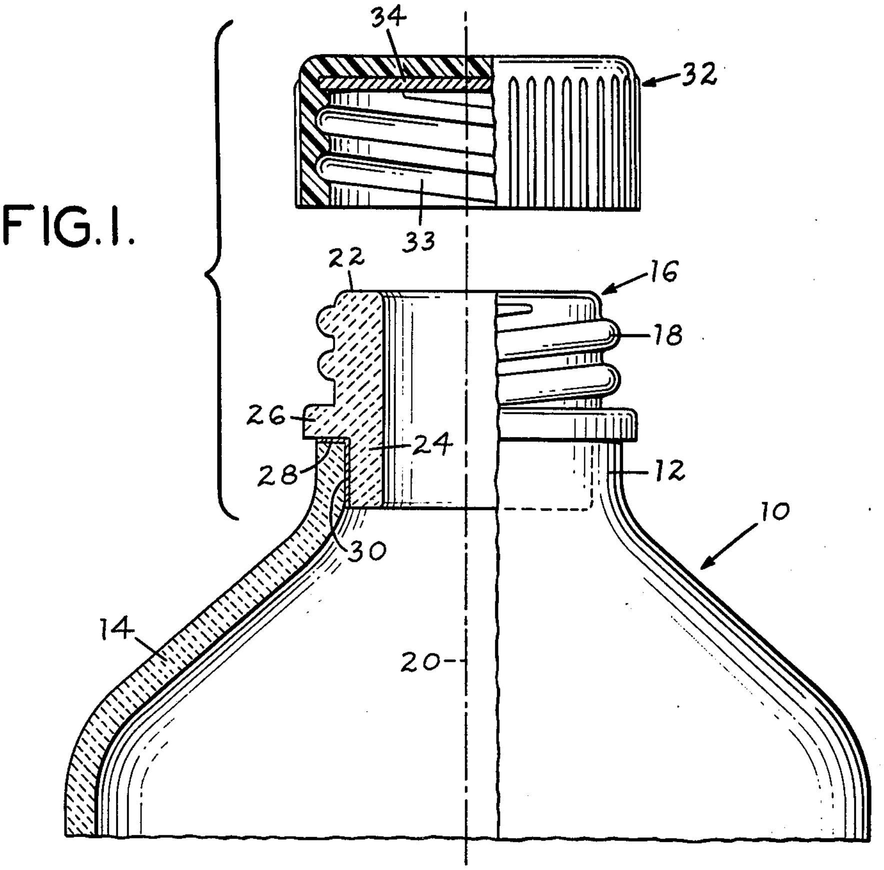
FIG. 1 is a partial cross-sectional and partially elevational view of the neck and upper portion of a bottle in accordance with this invention, the cap also being shown spaced above the bottle.

In FIG. 1 an adapter generally indicated at 16 is shown having threads 18 thereabout on the exterior surface thereof. The axis of the threads 18 is indicated at 20 and the outer sealing edge of the adapter 16 is indicated at 22. The right angular relationship between the axis 20 and the plane of the sealing edge 22 is critical to adequate sealing of the bottle with a screw cap. Additionally, it is important to adequate sealing that the sealing edge 22 lie in a single plane all about its circular extent with a minimum of projections, indents or segments lying in a different plane. While some minor deviations from an exactly right angular relationship between the axis 20 and the sealing edge 22 is permissible, it takes very little deviation from a perfectly right angular relationship before the cap will fail to seal adequately to retain liquids in the bottle, particularly low density liquids such as whiskey or other alcoholic beverages. As mentioned above, such accuracy is not possible using conventional bottle molding processes.

Accurate threads have been made successfully of ceramic material, particularly porcelain, for use in various electrical applications such as fuses, insulators, light fixtures and the like by a process in which the vitrifiable slip is molded under great pressure. The slip may contain from about 4% to about 15% by weight of water initially and is formed in hardened steel dies under sufficient pressure that upon removal from the die the piece holds together even without firing with considerable integrity and can be handled readily. Pressure sufficient to produce this condition may in some variations of the method be referred to as "isostatic" pressing. Further, while reference is made here to a "slip" with reference to this forming method, it must be understood that the material used in forming a piece by this method is very dry and is, in fact, granulated material used as feed stock and prepared by any suitable method such as (1) spray drying, (2) filter pressing by drying a slip in a filter press and then finely dividing the cake that results in the filter press as a result of the removal of water therefrom, or (3) mulling by treating the clay and the requisite water in a muller. Since this method of formation utilizing high pressures uses ingredients at a much drier state than the usual slip casting used for the bottle, this method is referred to herein as the "dry press" method and contemplates the use of ingredients having a water content by weight of about 4% to about 15% molded under a high pressure to form a handleable piece. This is a well-known method of forming ceramic bodies and one of the most common uses for it is in the manufacture of the porcelain bodies of spark plugs.

It has now been found possible to utilize a porcelain adapter formed in this manner with the shape of a bottle neck and having external threads by applying the adapter to the opening of ceramic bottles and then firing the same integrally with the bottle. Since the degree of precision attainable by the dry press forming method is far superior to that normally associated with the molding of bottles, the desired degree of accuracy with respect to the right angular relationship between the sealing outer edge of the neck and the axis of the threads can be achieved. By firing the adapter integrally with the bottle, the manufacture of threaded ceramic bottles capable of accepting suitable threaded caps with sufficient tightness and sealing to insure retention of liquids, particularly whiskey, is possible.

In the present invention, the adapter 16 is separately formed by the dry press molding process with great accuracy in the relationship between the axis 20 and the sealing surface 28. The adapter 16 has a depending cylindrical portion 24 for insertion into the neck 12 of the bottle 10 and an arcuate projection 26 providing a shoulder 28 which rests on the upper edge of the neck 12.

Figure 3:
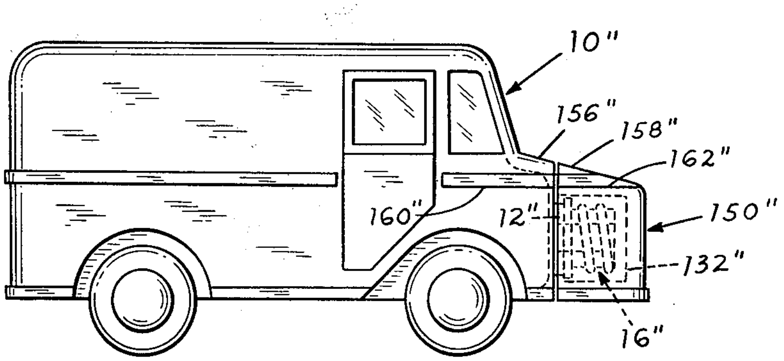
FIG. 3 shows a decorative type bottle in which the filling and pouring neck is located on the side.

After casting of the bottle 10 and the performance of such other steps as may be desired, a glaze is applied to the surface 28 or the surface 30 or both of the adapter 16. The adapter 16 is then placed within the neck 12 of the bottle and the unit is then fired, preferably for porcelain, at temperatures of approximately 2400° F. The glaze applied to the surfaces 28 and 30 serves to integrate the adapter 16 with the bottle 10 during firing and as a result the completed bottle with a threaded neck is a single integral fused fired piece of ceramic such as porcelain. The ceramic glaze applied to the surfaces 28, 30, or both also serves to temporarily hold the adapter 16 in place in the neck 12 of the bottle until the same is fired. This latter purpose is particularly important when the neck 12 of the bottle is disposed at some position on the container other than the top such as commonly occurs in decorative bottles in which the neck opening 12 may well be disposed at the side of the bottle such as shown in FIG. 3. In FIG. 3 the bottle 10″ has its filling and pouring neck 12″ disposed laterally when the decorative shape is upright, In such instances, the adapter 16″ is held temporarily in the neck 12″ by means of the glaze applied to mating surfaces of the bottle and adapter as herein described for FIG. 1. Then, when fired, the glaze serves to integrate the bottle with the adapter.

Figure 2:
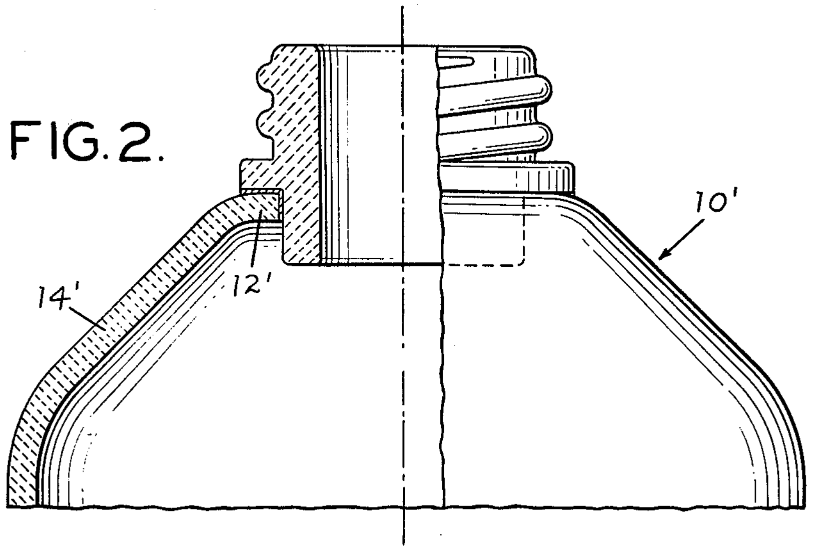
FIG. 2 is similar to FIG. 1 but with a different shape of bottle.

FIG. 2 merely shows a bottle having its opening differently defined and the various parts that correspond to those shown in FIG. 1 are shown with a prime (′) added to the reference characters.

The adapter 16 may either be fired or unfired at the time it is placed in position in the neck 12 of the unfired bottle 10. If the adapter 16 is already fired at sufficient temperature, it will have achieved its final dimension and will be centered automatically within the neck 12 as the bottle 10 is fired and shrinks due to the firing as commonly occurs. The entire bottle including the neck 12, of course, shrinks somewhat during firing and as the neck 12 shrinks, it will automatically draw tightly against and center the adapter 16 as well as integrate therewith by virtue of the presence of the glaze on the surfaces of either 28 or 30 or both.

If the adapter 16 is unfired at the time it is placed in the unfired bottle 10, the composition of the adapter must exhibit certain characteristics comparable with the characteristics of the composition of the bottle 10 itself. For example, the shrinkage characteristics of the unfired material of the adapter 16 must be substantially the same as the shrinkage characteristics of the material of the bottle 10. For example, both unfired compositions might commonly have shrinkage characteristics of about 10 to 12%, but whatever the degree of shrinkage in the two materials, they must both exhibit a very similar degree of shrinkage.

Additionally, a previously fired adapter 16 may have a suitable glaze applied to one or both of the surfaces 28, 30 and then be inserted in the neck 12 of a previously fired bottle and the assembly again fired to integrate the adapter and bottle into the single integrated piece. Of course, this involves the additional cost of an additional firing step that is not otherwise necessary and as such will likely be undertaken only when circumstances justify the added costs. Nevertheless, from a technical standpoint it has been found that a fired adapter can be integrated with a fired bottle upon refiring.

Figure 4:
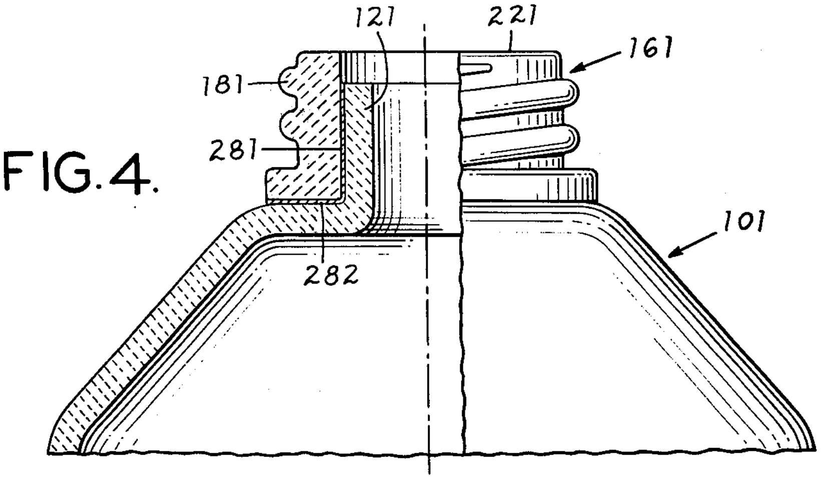
FIG. 4 shows a modification of the adapter shown in FIG. I.

It will be appreciated from what has been said above that, upon firing, the bottles of this invention shrink as do the adapters. Accordingly, it is not possible to add an unfired adapter to a previously fired bottle if such adapter is shaped as shown in FIGS. 1 and 2, for in such instances the adapter, if unfired, would shrink away from the opening in the already fired bottle and fail to integrate therewith. FIG. 4, however, shows an arrangement whereby an unfired adapter 161 may be combined with a previously fired bottle 101. The bottle 101 having a neck portion 121 formed integrally with the remainder of the bottle 141 is molded in plaster mold halves in the conventional manner described above. An adapter 161 is separately molded under high pressure in accordance with the "dry press" method of formation discussed above. The adapter 161 has threads 181 integrally formed therewith and an outer sealing surface 221. Unlike the adapters 16, 16' or 16'', the adapter 161 is so dimensioned as to embrace the neck portion 121 rather than being embraced thereby as is the case with the previous adapters shown in FIGS. 1 and 2. As such, the adapter 161 encircles the neck 121 and may be fired integrally therewith in those instances when the adapter 161 is unfired, but the bottle 101 including the neck 121 is previously fired. A suitable glaze is added at either the interface 281 or the interface 282 or both by applying the same to either the appropriate surface of the bottle 101 or the appropriate surface of the adapter 161 or both. Subsequently, upon firing the adapter 161 will be fully ceramically integrated with the bottle 101 across either the interface 281, the interface 282 or both. In this arrangement as shown in FIG. 4 the adapter 161 being unfired will shrink to the neck 121 of the bottle and integrate therewith even though the neck 121 will not shrink any further having been previously adequately fired.

Accordingly, either a fired or unfired adapter may be ceramically integrated upon firing with either a fired or unfired bottle. That is to say that the four combinations are all successful:

1. Unfired adapter, unfired bottle
2. Fired adapter, unfired bottle
3. Fired adapter, fired bottle
4. Unfired adapter, fired bottle Combinations 1, 2 and 3 above are possible with the arrangements shown in FIGS. 1 and 2, whereas combinations 1, 3 and 4 are possible with the arrangement shown in FIG. 4.

The term "glaze" has been used herein to refer to any material applied at one or more of the surfaces of either the adapter or the bottle which mate with a mating surface of the other and which upon firing serves to integrate the adapter and the bottle. The exact material of this glaze will vary depending upon the specific composition of the adapter and bottle and will in part depend upon whether one or the other of the adapter and the bottle have been fired before application of the glaze and application of the adapter to the bottle neck. One material, in addition to glazes commonly used in the industry, which is comprehended within the above definition of "glaze" is so-called "stickum" slip. "Stickum" slip is a term generally used in the industry to refer to a slip which will temporarily adhere a piece of greenware to another piece of greenware. Usually, the "stickum" slip is a slip of the same composition as the greenware which it is intended to adhere but which slip has been treated with a material such as acetic acid or gum acacia to cause the slip to become very sticky and glue-like. Such a "stickum" slip is frequently used to adhere handles or feet to cups and pitchers in the ceramic art prior to a subsequent firing which will integrate such handles or feet with a cup or pitcher. Such materials as are contemplated for use as a "glaze" (as such term is used herein) are well known to one skilled in the art and such one skilled in the art will have no difficulty in selecting a suitable glaze for use in integrating the adapter and the bottle during a subsequent firing.

As shown in FIG. 1, a cap 32 having internal threads 33 shaped and dimensioned to cooperate with the threads 18 on the adapter 16 may be utilized. A sealing gasket 34 is positioned within the top of the cap 32 in conventional fashion. The material of the cap 32 and threads 33 should be of a softer, more lubricating material than the hard ceramic porcelain of the adapter 16 and its threads 18. Were the threads 33 of a similarly hard ceramic material, there would be great abrasion between them and repeated application and removal of the cap 32 would soon result in damage to the threads and failure to seal. Preferably the cap 32 and its threads 33 are molded from any common plastic material known and used in the art with polyethylene or polypropylene being illustrative only and not limiting. The cap can, of course, be of wood, metal, metal film and the like. It is only necessary that the material of the threads 33 be sufficiently softer or more deformable than the ceramic threads 18 as to avoid abrading the same. By tightening the cap 32 onto the adapter 16, the sealing edge 22 will be brought tightly to bear against the sealing gasket 34 which may be any conventional material known and used for the purpose including coated paper coated with plastic, rubber gaskets, synthetic rubber, wholly plastic gaskets or the like. The cap 32 and the gasket 34 are not in themselves unique and several varieties of the same are well known.

In a number of decorative ceramic bottles, the bottle when taken with the cap and cover represents a figure as in FIG. 3. In FIG. 3 the bottle represents a truck, the front and engine compartment of which comprises a ceramic top 150'' placed over a plastic cap 132'' screwed to the threaded ceramic neck 16''. The threaded neck 16'' comprises an adapter fired integrally with the neck 12'' of the bottle 10'' in the same manner as adapter 16 and neck 12 in FIG. 1. As indicated, the top 150'' is fired ceramic material of the same material as the bottle 10'' and as described hereinbelow for the top 150. It will be appreciated that the top 150'' must be properly oriented with respect to the bottle 10'' in order to accurately complete the truck figure. For example, the hood line 156'' must align with the hood line 158'' on the ceramic top and the decorative strip 160'' must align with the decorative strip 162''. It will be appreciated that capping of the bottle 10'' with the plastic cap 132'' after filling of the same must be carried to the point of adequately sealing the bottle to hold the contents and this degree of tightness may or may not correspond with proper alignment of the lines 156'', 158'' and the lines 160'', 162''. Accordingly, the ceramic top 150'' is applied to the plastic cap 132'' after the cap 132'' is applied to the bottle. Such application of the top 150'' to the cap 132'' is described hereinbelow with reference to FIG. 5.

Figure 5:
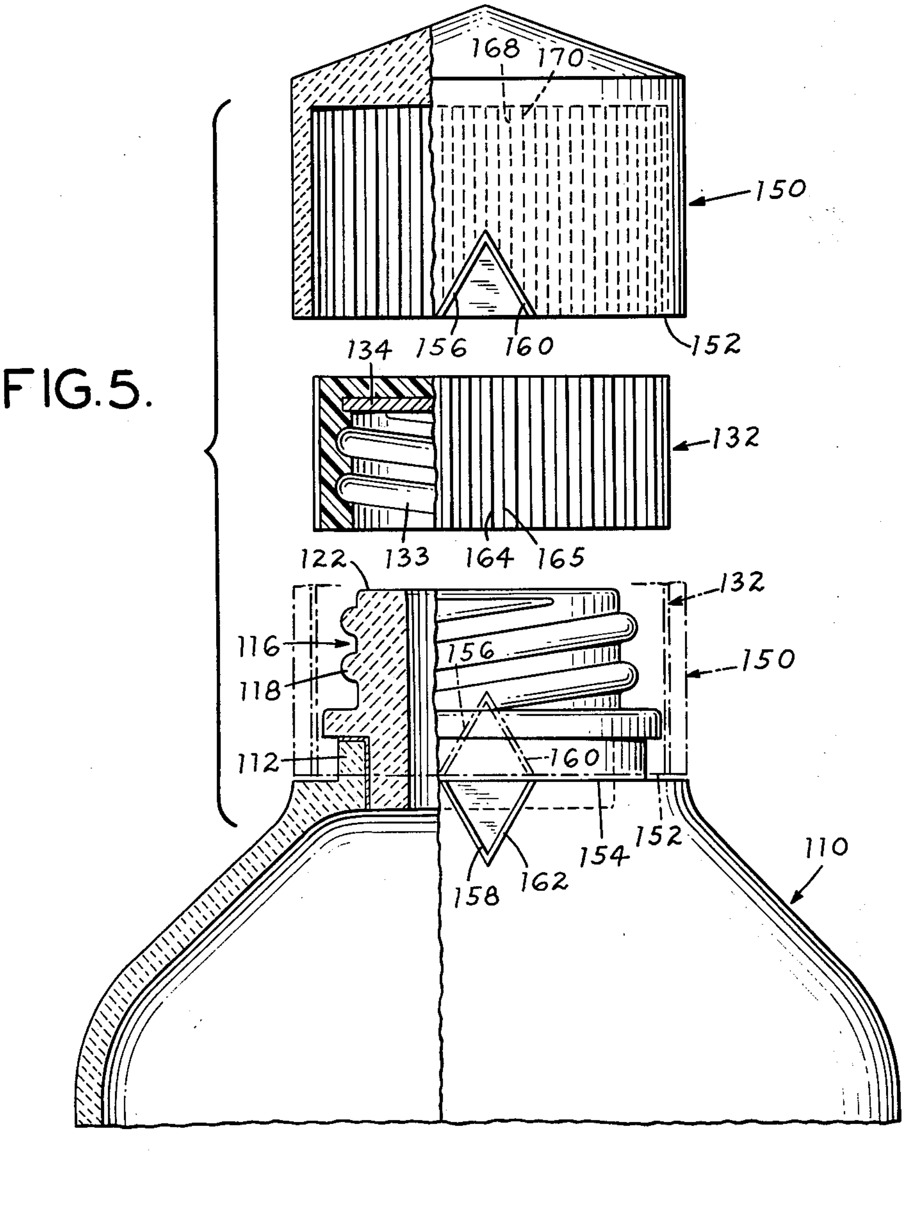
FIG. 5 shows the bottle of the invention with a cap and decorative top.

In FIG. 5 there is shown a fired ceramic bottle 110 having an adapter 116 which has been inserted in the neck 112 of the bottle 110 and fired integrally therewith. The threads 118 of the adapter 116 receive the cap 132 by engagement with the threads 133 thereof in a manner similar to that discussed above with reference to FIG. 1 and the sealing edge 122 of the adapter 116 seals against the gasket 134 in the manner as described above.

As shown in FIG. 5 the bottle 110 represents a figure which is completed only by the addition of the top 150. The top 150 is also of fired ceramic material and is designed to be placed over the cap 132 and to completely enclose the same with the lower edge 152 of the top being in close proximity to a matching line 154 on the bottle 110. The top is shown removed from the bottle in solid lines and applied to the bottle in phantom lines in FIG. 5. It will be appreciated that the orientation of the top 150 is critical in order to complete the figure represented by the completed bottle 110 when combined with the top 150. Portions of the figure are present both on the bottle and on the top and must be matched in order to give the appropriate representation of the figure. As shown, for example, the decorative line 156 on the top 150 must closely match and align with the decorative line 158 on the bottle 110. Similarly, the decorative line 160 on the top must closely match and align with the decorative line 162 on the bottle 110.

Evenly spaced about the outer periphery of the cap 132 are a plurality of serrations which comprise alternating lands and grooves 164, 165, respectively, dimensioned to be engaged by internal grooves and lands 168, 170 on the top 150. It will be appreciated that the number of lands 170 and grooves 168 in the top 150 need not equal the number of grooves 165 and lands 164 on the outer surface of the cap 132, though they may. Commercially, eight lands are presently preferred though only one is actually required to insure orientation of top 150 on bottle 110.

As mentioned, the top 150 is of the same fired ceramic material as the bottle 110 and constitutes, when in place on the bottle cap 132, a completion of the figure most of which is represented by the bottle shape itself. The lands 170 and grooves 168, of course, are molded integrally with the top 150 and are fired therewith whereby the entire top is ceramic.

After firing of the bottle 110 and adapter 116 into an integral one-piece bottle with or without appropriate decorative glazing, the bottle will, commonly, be shipped to a bottler together with the matching ceramic top 150 which has also been fired. The bottler will then fill the bottle 110 and apply the sealing cap 132 either manually or by equipment well known in the industry. The decorative top 150 is then positioned in the appropriate position to insure alignment of the decorative features such as the features 156, 160 on the top with the decorative features 158, 162 on the bottle and the lands and grooves 170, 168 of the top are engaged with the lands and grooves 164, 165 on the cap 132. The top 150 is then pressed downwardly either by hand or by striking the upper surface of the top 150 with a rubber mallet. This will drive the top 150 downwardly to completely hide and cover the cap 132 with the lower edge 152 of the top in close proximity to the mating line 154 on the bottle 110. Subsequently, the user may remove the cap merely by twisting the top 150 which will remove the top 150 and the cap 152 as a unit due to the frictional engagement between the lands and grooves of the top and the lands and grooves of the cap. Of course, the user may recap the bottle more or less tightly than it was capped during its initial filling and as such the top 150 may or may not return to alignment with the body portion of the bottle 110; however, if the user desires, he may work the top 150 upwardly off the cap 132 and reposition the same unless the same is engaged by the friction so strongly as to prevent such removal and unless the manufacturer has, as he may wish to do, supplied an adhesive appropriately located between the top 150 and cap 132.

Since the top 150 will commonly be molded in the same manner as the bottle 110 from a slurry or slip having about 25%-30% water by weight, the strength of the lands and grooves 168, 170 in the fired piece will tend to be less than, say, that of the threads 118 on the adapter 116 which is formed under high pressure in the dry press process with a minimum quantity of water as previously mentioned. Also, it will be difficult under most molding techniques (other than that described above for the adapter 116) to control accurately the dimensions of the lands and grooves 168, 170. Because of this lessened strength or accuracy, there may be a tendency for the lands to break off after the top has been placed over the cap and an attempt is made to unscrew the cap. Accordingly, under such circumstances, it may be desirable to utilize an adapter within the top as shown in FIG. 6.

Figure 6:
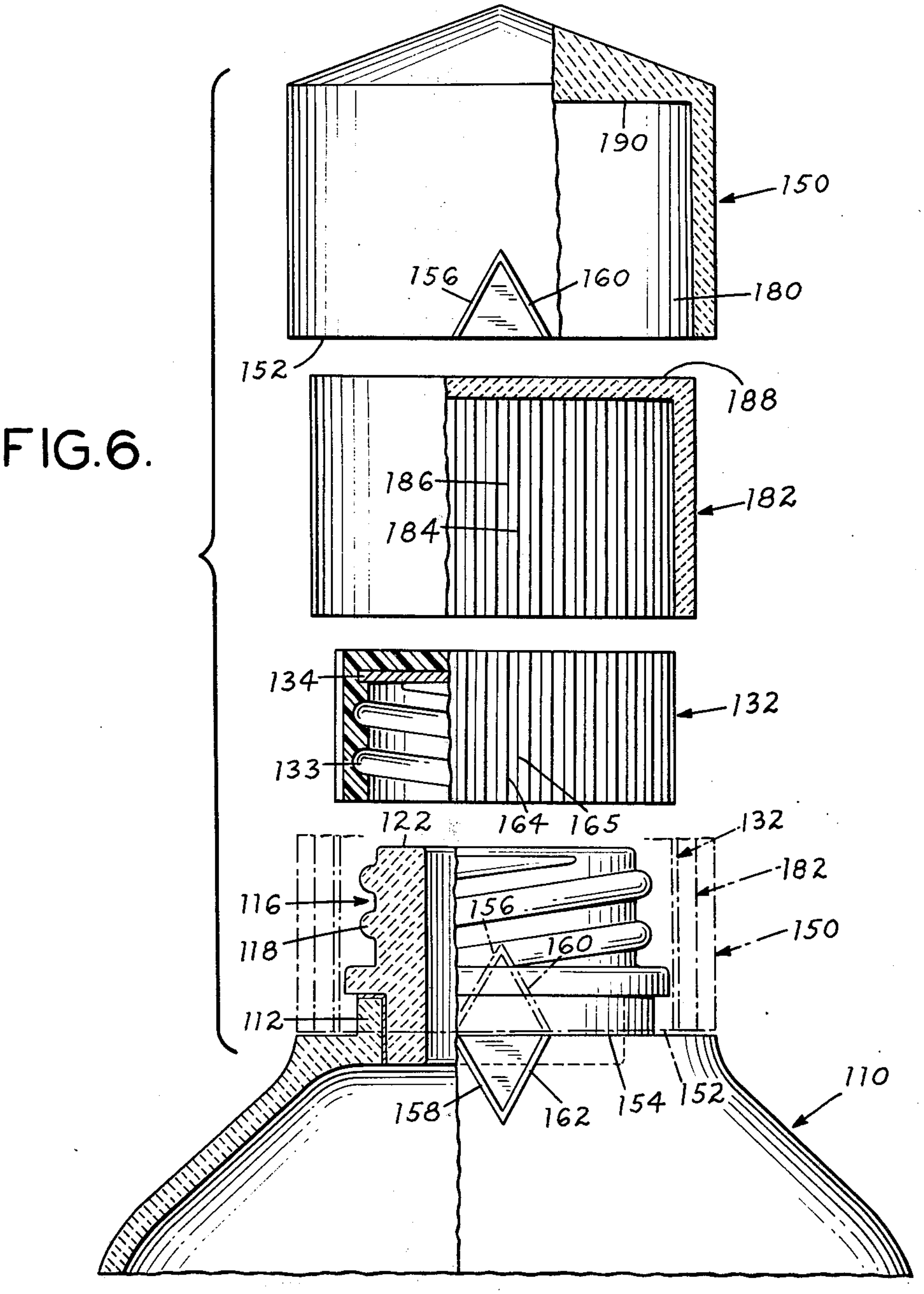
FIG. 6 is a modification of FIG. 5 showing a different type of decorative ceramic top arrangement.

As shown in FIG. 6, the parts having the same numerals as the parts in FIG. 5 are the same with the exception that the top 150 does not have the lands and grooves 168, 170 shown in FIG. 5. Instead, secured by a suitable adhesive in the cavity 180 of the top 150 is an adapter 182 having lands and grooves 184, 186 formed integrally therein. The lands and grooves 184, 186 are dimensioned to be snugly received between lands and grooves 164, 165 of the cap 132. The adapter 182 may be secured by an epoxy or other suitable adhesive applied along the top surface 188 of the adapter and the same pressed in place within the cavity 180 with the surface 188 in contact with the surface 190 at the bottom of the cavity 180.

In this modification the adapter 182 is, like the adapters 16 and 116, formed from a very dry slip in a hardened steel mold under intense pressure as above described with reference to the adapters 16 and 116. In this way the lands and grooves 184 and 186 may be very accurately manufactured and will have high strength upon the completion of firing.

In both the modifications of FIGS. 5 and 6, the cap 132 is preferably of molded plastic material as above described for the cap 32 since such molded plastic caps tend to exhibit a lubricating quality both with respect to the threads and the lands and grooves. Nevertheless, while plastic is preferred, other materials may be used as above mentioned for the cap 132. When the adapter 182 is used, it is preferably fired separately from the decorative top 150 and then adhered in place as above mentioned; however, if desired, either a fired or unfired adapter 182 may be placed in position within the cavity 180 with a glaze applied to the surfaces 188 or 190 or both and then the top and adapter fired to make them integral in the same manner as described for the adapter 16 and the bottle 10.

Heretofore the market for fired ceramic bottles has been limited by the fact that certain applications require what is referred to as a "shaker" type top. A shaker top has a very small opening suitable for shaking small quantities of liquid or other material from a bottle in order to limit the quantity of material removed from the bottle. Such shaker type tops are very commonly used on such items as perfume, cologne, after-shave lotion and the like and comprise bottles, almost always of glass, with exceedingly small openings in the top thereof. Since the purpose of these small openings is to limit the quantity of material removed during any one shake, it has not heretofore been possible to produce such shaker type bottles from fired ceramic materials. As indicated above, this is due to the fact that after the wall thickness of the bottle has dried sufficiently in the plaster molds, the excess slip, amounting to the entire volumetric content of the finished bottle, must be poured out of the filler opening. It is, therefore, impossible to accomplish this pouring out of the excess slip in the usual manner by simply inverting the green bottle when the opening is so small as to constitute a shaker type opening of the type above described. It has been found, however, that by use of the method of this invention wherein an adapter is fired to the bottle at the bottle opening, it is possible for the first time to provide a ceramic bottle with a shaker top opening.

Figure 7:
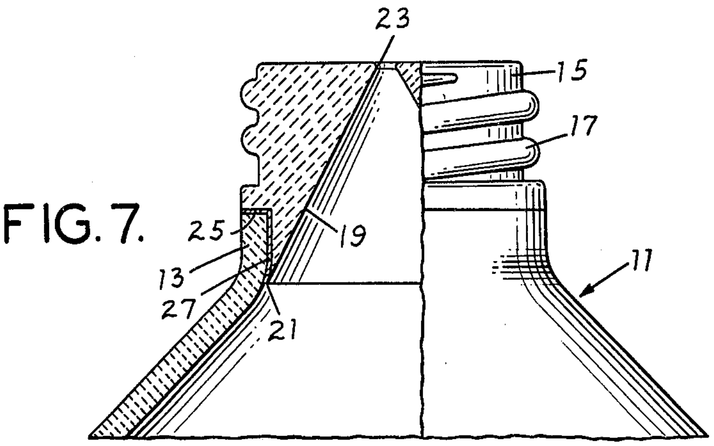
FIGS. 7, 8 and 9 show adapters for providing ceramic bottles with small shaker type openings.

Shown in FIG. 7 is a bottle 11 having a neck portion 13. Fitted within the neck 13 is an adapter 15 similar to the adapter 16 of FIG. 1 and having threads 17 integral therewith in the same manner as the threads 18 of FIG. 1.

Internally, the adapter 15 has a frustro-conical cavity 19 having a large lower opening 21 and a very small upper opening 23. The bottle 11 is cast in plaster molds in the same way as the bottle 10 above described and the adapter 15 with its integral threads 17 and its hollow interior 19 and tiny opening 23 is formed by the dry press method above described with reference to the adapter 16. The fired or unfired adapter 15 is fitted to the opening in the neck 13 with a suitable glaze provided at one or both of the interfaces 25 or 27 and, finally, the adapter 15 and bottle 11 are fired to produce a single integral unit, all as described above with reference to the adapter 16 and the bottle 10.

Figure 8:
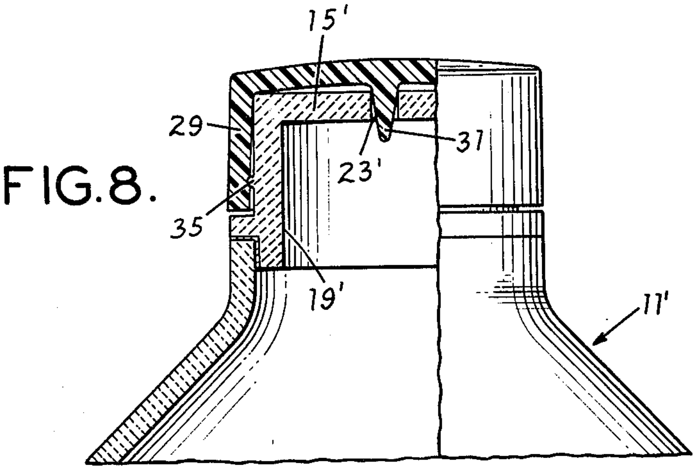

In some shaker type applications a cap like the cap 32 is screwed to the top utilizing the integral threads 17. However, the invention here contemplates the provision of shaker type openings for ceramic bottles irrespective of whether threaded caps, snap caps or other like caps are used. For example, FIG. 8 shows an arrangement in which the adapter 15' has a circumferential rib 27 formed integrally therewith for engagement with a plastic snap cap 29 having a suitable groove mating with the rib 35 the opening 23' is a shaker type opening and is closed by means of a dependent plug 31 on the cap 29. It will be appreciated that the cap 29 as shown in FIG. 8 is but one of many snap type caps that may be utilized to close the shaker type opening 23' and as such the cap 29 is shown for illustrative purposes only, other snap type caps being very well known.

FIG. 8 also shows that the internal cavity 19' may by cylindrical rather than frusto-conical as with the cavity 19. Again, the adapter 15' is formed by the dry press method and applied to the bottle 11' in the same manner as described above with reference to FIG. 1.

Figure 9:
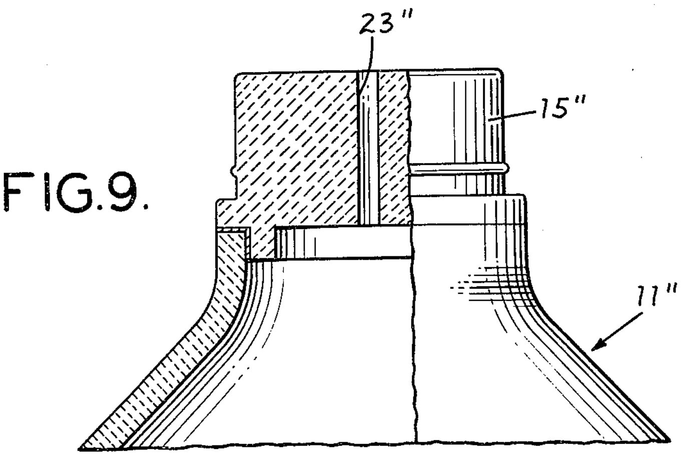

FIG. 9 shows yet another configuration for the shaker opening. In this instance, the adapter 15" is relatively solid and has a long cylindrical shaker opening 23" therein. Again, the adapter 15" with the shape shown and the opening 23" therein is formed by the dry press method and fired to the bottle 11" in the same manner as described with reference to FIG. 1.

It will be appreciated that the shaker tops have openings therein so small as to induce one to shake the bottle to remove the contents rather than to merely pour from the bottle. While this size opening may vary somewhat depending upon a number of variables including the viscosity and surface tension of the material in the bottle, it is always small relative to the size of opening that can normally be formed by the conventional slip cast method. As used herein, the term "shaker size" with reference to such an opening means any opening too small to permit the pouring out of the excess slip in the normal manner when slip casting a bottle in plaster molds.

I claim:

1. The method of making a fired ceramic bottle having a threaded neck comprising molding said bottle with an opening therein in plaster molds from a clay slip; separately forming an adaptor having an opening therethrough and external threads thereon by pressing a vitrifiable material under sufficient pressure in a mold to form a handleable piece, the outer sealing surface of said adaptor being in a plane substantially perpendicular to the axis of said threads, said perpendicular relationship between the plane of said outer surface of the axis of the said threads being sufficiently accurate to insure liquid tight sealing of said outer surface against the sealing element of a threaded cap; applying said adaptor to said bottle with the opening in said adaptor communicating with the opening in said bottle, and firing said adaptor and bottle to integrate them into a single unitary ceramic piece.

2. The method of making a fired ceramic bottle having a threaded neck comprising molding said bottle with an opening therein in plaster molds from a clay slip, separately forming an adapter having an opening therethrough by pressing a vitrifiable granular material having from about 4% to about 15% water by weight in a die under pressure sufficient to form the same into a piece of handleable integrity, said bottle and said adapter having mating surfaces, applying glaze to at least one of said surfaces, applying said adapter to said bottle with the opening in said adapter communicating with the opening in said bottle and with said surfaces mated, and firing said adapter and bottle to integrate them into a single unitary ceramic piece.

3. The method of claim 1 in which there are mating surfaces on said bottle adjacent its said opening and on said adapter, and glaze is provided on at least one of said surfaces prior to said firing.

4. The method of claim 1 in which neither said bottle nor said adapter have been fired prior to application of said adapter to said bottle.

5. The method of claim 1 in which said adapter is separately fired before application to said bottle.

6. The method of claim 1 in which said bottle has been fired prior to application of said adapter to said bottle.

7. The method of claim 1 in which both said bottle and said adapter are separately fired before application of said adapter to said bottle.

8. The method of claim 1 in which the firing of said bottle and said adapter is carried out at a temperature sufficient to fire said bottle and adapter to porcelain.

9. The method of claim 1 in which said opening in said adapter has an exit orifice of shaker size.

10. The method of making a fired ceramic bottle comprising molding said bottle with an opening therein in plaster molds from a clay slip; separately forming an adaptor having an opening therethrough, said opening adjacent one end of said adaptor being of shaker size, by pressing a vitrifiable material in a mold under sufficient pressure to form a handleable piece; applying said adaptor to said bottle with the opening in said adaptor communicating with the opening in said bottle and with the end of said opening that is of shaker size being outermost; and firing said adaptor and bottle to integrate them into a single unitary ceramic piece.

* * * * *